(12) United States Patent
Xu et al.

(10) Patent No.: US 10,801,838 B2
(45) Date of Patent: Oct. 13, 2020

(54) TOPOGRAPHY-OBSERVATION DEVICE BASED ON THE MECHANICALLY MICRO-ADJUSTABLE DUAL HOSTS

(71) Applicant: Dalian University of Technology, Dalian, Liaoning (CN)

(72) Inventors: Xiangzhou Xu, Liaoning (CN); Wenzhao Guo, Liaoning (CN); Hongwu Zhang, Liaoning (CN); Lu Gao, Liaoning (CN); Xingyang Zhao, Liaoning (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/647,937

(22) PCT Filed: Apr. 8, 2018

(86) PCT No.: PCT/CN2018/082124
§ 371 (c)(1),
(2) Date: Mar. 17, 2020

(87) PCT Pub. No.: WO2019/195954
PCT Pub. Date: Oct. 17, 2019

(65) Prior Publication Data
US 2020/0278204 A1    Sep. 3, 2020

(51) Int. Cl.
*G06T 11/00* (2006.01)
*G01C 11/00* (2006.01)
*G01C 15/00* (2006.01)

(52) U.S. Cl.
CPC ............ *G01C 11/00* (2013.01); *G01C 15/004* (2013.01)

(58) Field of Classification Search
CPC ....... G06T 11/001; G06T 17/00; G06T 17/05; G06T 17/10; G06T 15/80; G06T 2200/04;
(Continued)

(56) References Cited

U.S. PATENT DOCUMENTS 3,749,493 A * 7/1973 Macovski .............. G01C 11/00
356/2
9,824,490 B1 * 11/2017 Cote ....................... E02F 9/261
(Continued)

FOREIGN PATENT DOCUMENTS

CN          201561754 U       8/2010
CN          101832773 A       9/2010
(Continued)

*Primary Examiner* — Hoa Q Pham
(74) *Attorney, Agent, or Firm* — Muncy, Geissler, Olds & Lowe, P.C.

(57) ABSTRACT

An instrument for dynamically observing the evolution behavior of the slope topography. The dual hosts emit parallel, equal-height and overlapped laser planes from different directions, and project the laser planes onto a slope landform. The image acquisition device shoots the slope landform with the projected laser lines at an angle perpendicular to the laser-planes. Then a video screenshot can be formed and imported into a computer to form a three-dimensional map. Finally, the volume, slope gradient and other parameters of the slope body can be obtained. As the knobs on the mechanically micro-adjustable host of the topography meter are turned, the laser-planes can become precisely equidistant and parallel. A novel topography meter is disclosed, which can conveniently calibrate the spacing and angle of the linear lasers and accurately observe all landforms including the local deep trenches on an eroding slope.

1 Claim, 5 Drawing Sheets

(58) Field of Classification Search
CPC .......... G06T 7/90; G06T 19/20; G06T 19/00;
G06T 19/006; G01B 11/24; G01B
11/2513; G01B 11/2522
USPC .......... 356/601–623; 382/154; 702/152, 167
See application file for complete search history.

(56) References Cited

U.S. PATENT DOCUMENTS

| | | | | |
|---|---|---|---|---|
| 2019/0128690 A1* | 5/2019 | Madsen | ................ | A01B 63/023 |
| 2020/0098151 A1* | 3/2020 | Scherer | ................... | G06T 5/008 |
| 2020/0150308 A1* | 5/2020 | Xu | ........................... | G01V 8/20 |

FOREIGN PATENT DOCUMENTS

| | | |
|---|---|---|
| CN | 103487566 A | 1/2014 |
| CN | 103487567 A | 1/2014 |
| CN | 105387811 A | 3/2016 |
| CN | 108534758 A | 9/2018 |
| JP | 2005010065 A | 1/2005 |

\* cited by examiner

A-A

TOPOGRAPHY-OBSERVATION DEVICE BASED ON THE MECHANICALLY MICRO-ADJUSTABLE DUAL HOSTS

TECHNICAL FIELD

The present invention belongs to the technical field of device studying soil and water conservation, which relates to an instrument for dynamically observing the evolution behavior of the slope topography.

BACKGROUND

Due to the complexity of a soil erosion phenomenon, reliable methods are anticipated to observe and analyze the erosional landform to obtain the occurrence mechanism of soil loss. The observation methods of soil erosion in the world can be categorized into two types: namely the investigation method after the rainfall and dynamic observation method during the rainfall. The former is a method to inversely derive the amount of soil erosion via investigating the geomorphic features after rainfalls, e.g. the investigation for the gravity erosion in a small watershed of Qiaogou, Suide County, Shaanxi Province (Yang J, Yao W, Wang L. 2014, Study on the Regularity and Mechanism of Gravity Erosion in the Loess Gully, Yellow River, 36: 93-96 (in Chinese)). In virtue of the non-contact measurement methods and technologies such as the laser scanner, it is possible to conduct an situ observation for the high-risk terrain formed by the gravity erosion, e.g., the studies conducted by Tang et al. (2015) and Chen et al. (2014), respectively (Tang H, Li Z, Li P, et al. 2015, Surface micro topography quantification and its relationship with runoff and sediment under simulated rainfall. Transactions of the Chinese Society of Agricultural Engineering (Transactions of the CSAE), 31(24): 127-133 (in Chinese); Chen Z, Lei T, Yan Q, et al. 2013, Measuring and calculation methods for landslide volume with 3-D laser scanner in Wenchuan earthquake area. Transactions of the Chinese Society of Agricultural Engineering (Transactions of the CSAE), 29(8): 135-144 (in Chinese)). However, if a laser scanner is used for observation, the local deep trenches and deep pits may become the blind spaces unavailable for the scanner, and then a total station has to be employed for a supplementary survey. The investigation method after the rainfall is a common way frequently applied in the field of water and soil conservation in virtue of its easy operation. However considerable errors may appear as the amount of failure mass is observed after rainfall, for part of the failure mass may be washed away by the flow or the failure scar may be replenished with the soil inputted from the upper reaches during the current rainfall or previous rainfalls. On the other hand, the type and amount of the soil erosion will be determined via the dynamic observation method as the researcher continuously observes the erosion process and landform shape during the rainfall. Hence the method can monitor the process of soil formation. Nevertheless, to carry out a dynamic observation during the rainfall is so difficult that few related researches are found in the literature. The team of the first inventor of this patent has developed a topography meter based on the structured laser, which could observe the three-dimensional geomorphological landform. The team has successfully developed 5 generations of topography meters since 2009, which realized the quantitative and dynamic observation of the gravity-erosion process on the gully sidewall in a rainfall-simulation experiment. Six China invention patents have been authorized concerning the topography meter, with the numbers of ZL201310422836.6, ZL201310422447.3, ZL201010502055.4, ZL201010502051.6, ZL201010144689.7 and ZL201010144655.8. The topography meter has been used to measure the gravity erosions in the experiments of several projects, for example, the key project of the National Natural Science Foundation of China (no. 5139003) and General Programs of the National Natural Science Foundation of China (no. 51079016 and no. 51179021). The observed results are all acceptable.

However, the above-mentioned topography meter still has the following disadvantages: (1) The positions and angles of the linear laser sources in the host should be calibrated before a new observation for the positions and angles may be changed if a topography-meter host is moved. Nevertheless, calibration of the topography meter is complicated and time consuming (2) If only a single topography meter is used to observe a narrow and deep gully, the laser-planes emitted by host may be disconnected as the lasers enter the gully. Hence the deep gully could not be accurately measured. To resolve the problems above mentioned, the application upgrades and improves the existing topography meters, proposes a dynamic observation method using the dual hosts, presents a new image acquisition device, and redesigns a mechanical fine-adjustable device. The novel topography meter designed according to the above ideas has completed the field observation for the behavior of the gravity erosion on the loess slope, which is supported by the National Natural Science Foundation of China (no. 51790021). The experimental results confirm that the improved topography meter is more convenient in operation, more comprehensive in scope and higher in accuracy. Here a patent protection is anticipated for the core technology improving the topography meter based on the mechanically micro-adjustable dual hosts.

SUMMARY

A technical problem to be solved by the present invention is to provide a novel topography meter which can conveniently calibrate the spacing and angle of the linear lasers and accurately observe all landforms including the local deep trenches on the slope.

The technical solutions of the present invention are shown as follows:

A topography-observation device based on the mechanically micro-adjustable dual hosts comprises the dual hosts, an image acquisition device and an accessory;

the dual hosts emit parallel and equidistant laser planes 5 from different directions, project the laser planes 5 onto a slope landform 4, and simultaneously dynamically observe the evolution behavior of the slope landform; the laser planes emitted by the dual hosts are overlapped; cooperating with the image acquisition device, the dual hosts can obtain a contour map of the slope landform and then form a three-dimensional slope model, so as to realize the dynamic observation for the slumping process of the slope landform under a rainfall;

the dual hosts are mainly composed of linear laser sources 13, micro-adjustable devices, power supply lines 14, main bottom plates 17, detachable rain covers 12 and screws 16; the dual hosts are connected with a power box 2, and they are fixed on the metal pedestals 3; the linear laser sources 13 and the micro-adjustable devices are arranged inside the detachable rain covers 12; the detachable rain covers 12 are fixed on the main bottom plates 17 using screws 16;

the mechanically micro-adjustable devices comprise the support rods, adjusting knobs 20, worms 18, handle knobs 15 and turbines 19; a plurality of mechanically micro-adjustable devices are fixed on the main bottom plates 17; each linear laser source 13 corresponds to a fixed mechanically micro-adjustable device; the linear laser sources 13 project a group of parallel and equidistant horizontal laser stripes onto the slope landform 4; the mechanically micro-adjustable devices are equidistant and parallel, and they are fixed on the cases of the dual hosts with the main bottom plates 17; the spacing of the support rods is same to the distance of the laser-planes;

the linear laser sources 13 are fixed on the upper ends of the support rods; the lower ends of the support rods are fixed on the main bottom plates 17; the laser-planes will become horizontal as the adjusting knobs 20 on the linear laser sources 13 are tuned; the turbines 19 are fixed and they penetrate through the support rods; the worms 18 with the handle knobs 15 are hinged with the turbines 19 through the threads; when the handle knobs 15 are rotated, the linear laser sources 13 will be slightly turned around the support rods because of the transmission of the rotatable turbines 19 and the worms 18, so that the axes of all the linear laser sources 13 are accurately perpendicular to the main bottom plates 17; after regulated with the adjusting knobs 20 and knobs handling worms 15, the dual hosts will emit a group of laser-planes, and then a group of equidistant and parallel laser lines will be formed on the slope landform 4;

two cover plates are vertically fixed to the main bottom plates 17 and respectively positioned on both sides of the mechanical fine-adjustment devices to provide a safety space for the mechanical fine-adjustment devices;

two cover plates are vertically fixed on the main bottom plates 17 and independently positioned on both sides of the mechanically micro-adjustable devices to provide a safety space for the mechanically micro-adjustable devices;

the image acquisition device comprises a camera 11, a computer 6, a bracket 9, and a video box 26 fixing the camera;

the bracket 9 is a height-adjustable four-leg bracket which is fixed on a stub with a bolt; several pairs of fixing holes 24 are drilled on the two cross rods to support the cross rod 8; the legs of the brackets 9 are two-section embedded structures, which are provided with equidistant connecting-holes 7 and held together with bolts 23; the legs are fixed on the pedestal 22; the support bar 8 is perpendicular to the bracket 9, and one end of the rod is suspended outside of the bracket 9; a pulley 10 with a clamping groove 21 is installed on the lower surface of the support bar 8; the pulley 10 is connected with the video box 26; the video box 26 can move back and forth along the clamping groove 21 of the support bar 8; the camera 11 is installed in the video box 26; at an angle perpendicular to the laser-planes, the camera 11 shoots the slope landform 4 with the parallel laser stripes; the data collected by the camera 11 will be transmitted to the computer 6 via a data cable which connects the camera 11 and the computer 6;

the accessory comprises the power box and the power supply lines; a transformer bank and a battery are arranged in the power box; an external power supply of 220V is converted to the weak current of 6-8 V in order to supply power for the linear laser sources 13; nevertheless, a battery will be used to supply power for the linear laser sources 13 if no external power supply is provided.

As the bolt on the observation bracket 9 for fixing the cross rod is released, the cross rod and the video box 26 fixed on the cross rod can be moved left and right in the horizontal direction. If the bolt on the cross rod is released, the video box can be pushed back and forth along the clamping groove 21 of the cross rod. As the fixing bolt on the stub is released, the video box 26 can be moved up and down in the vertical direction. If the handle knob 15 of the video box 26 is turned, the camera 11 will be slightly rotated around the support rod, and then the visual angle of the camera 11 will be adjusted so that the sight line of the camera is perpendicular to the laser-planes emitted by the dual hosts.

After the laser contours in a video screenshot have been imported into the GIS system of a computer, the elevation values will be assigned to the laser contours to form a three-dimensional map, and then the slope volume and gradient can be computed. The difference of the slope volumes before and after the erosion event is the erosion amount during the erosion event.

The benefits of the present invention are shown as follows:

1. The dual hosts of the topography meter simultaneously dynamically monitor the geomorphological evolution behavior of slope erosion, so as to make up for the deficiency caused by the laser lines blocked in some local landforms, and realize the observation without any blind angle in the whole process of the erosion event.

2. The emission angle and fixed position of the linear laser on the main board are determined by the vertical and horizontal micro-adjustable knobs, respectively. The most advantages of the new structure are that any adjustment of a laser source, whether spacing or angle modulation, will not change the positions of other laser sources.

3. The image acquisition device in the present invention realizes the accurate and omni-bearing translation and rotation of the camera in the three-dimensional space.

Observation of the landslide behavior in more than 100 events of rainfall-simulation experiments has been completed with the topography meter designed and manufactured according to the technology above mentioned, and the experimental results have confirmed the feasibility and reliability of the present invention.

Figure 1:
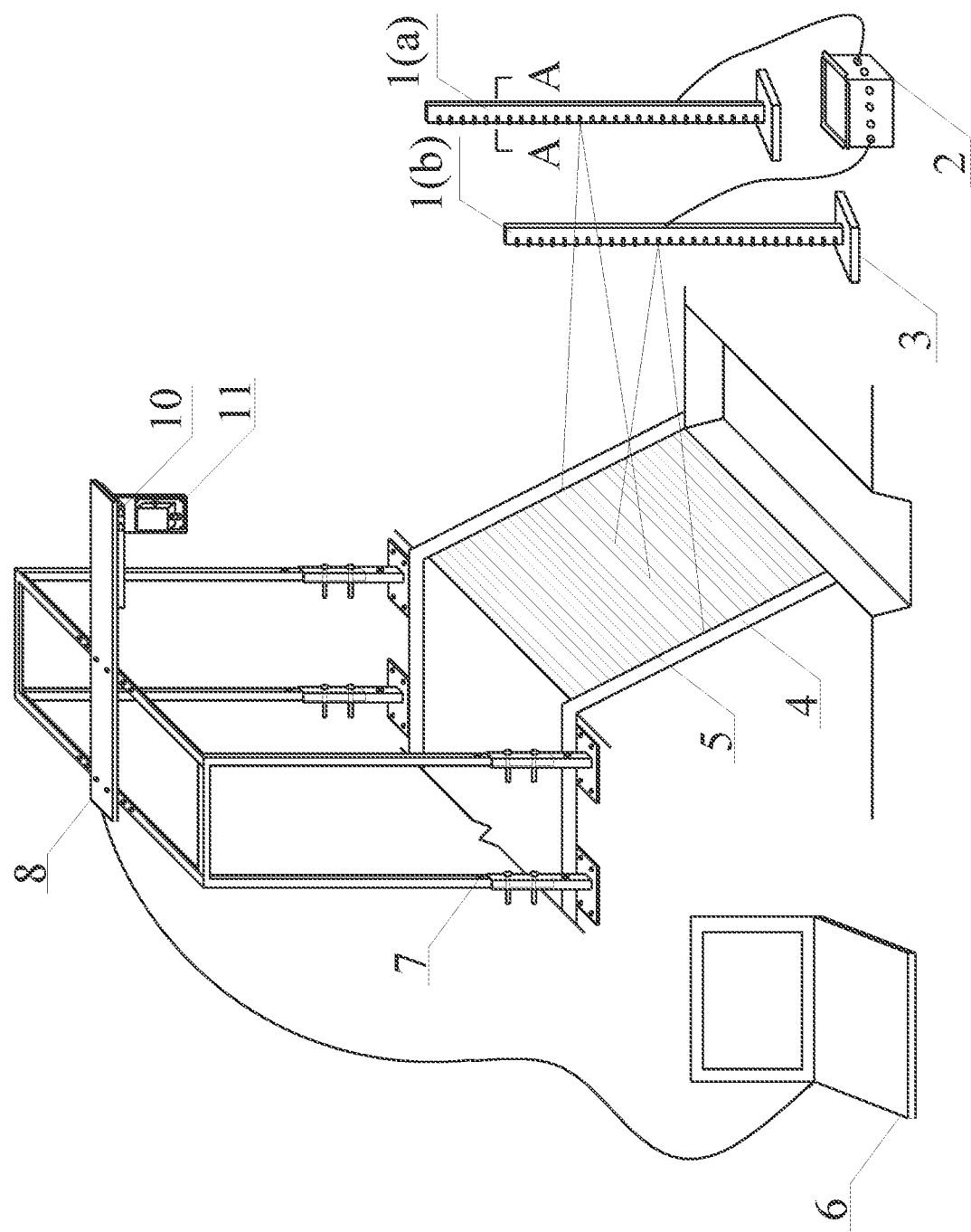
FIG. 1 is a schematic diagram for the working principle of the dual hosts.
Figure 2:
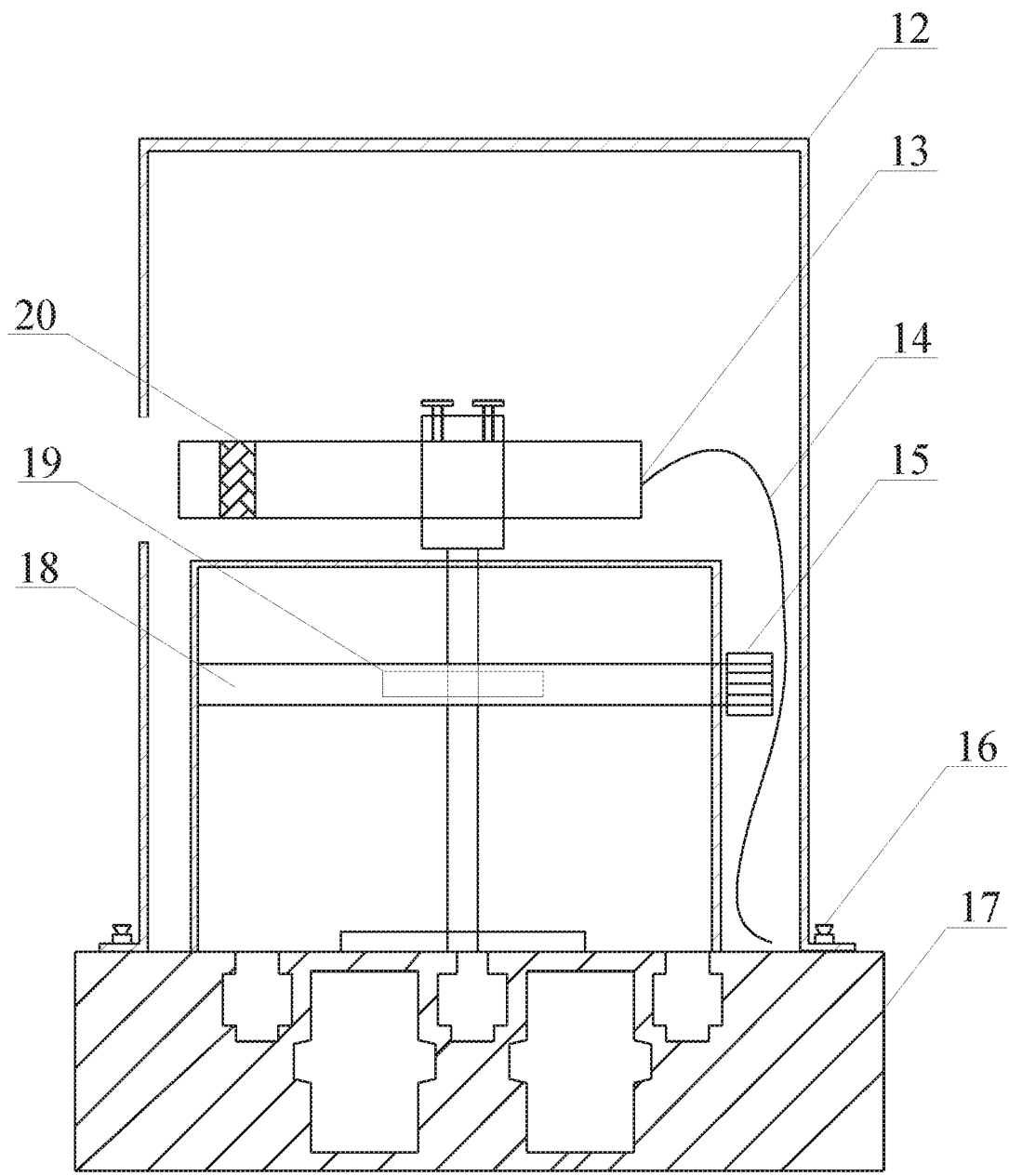
FIG. 2 is the cross-sectional view of a topography meter host.
Figure 3:
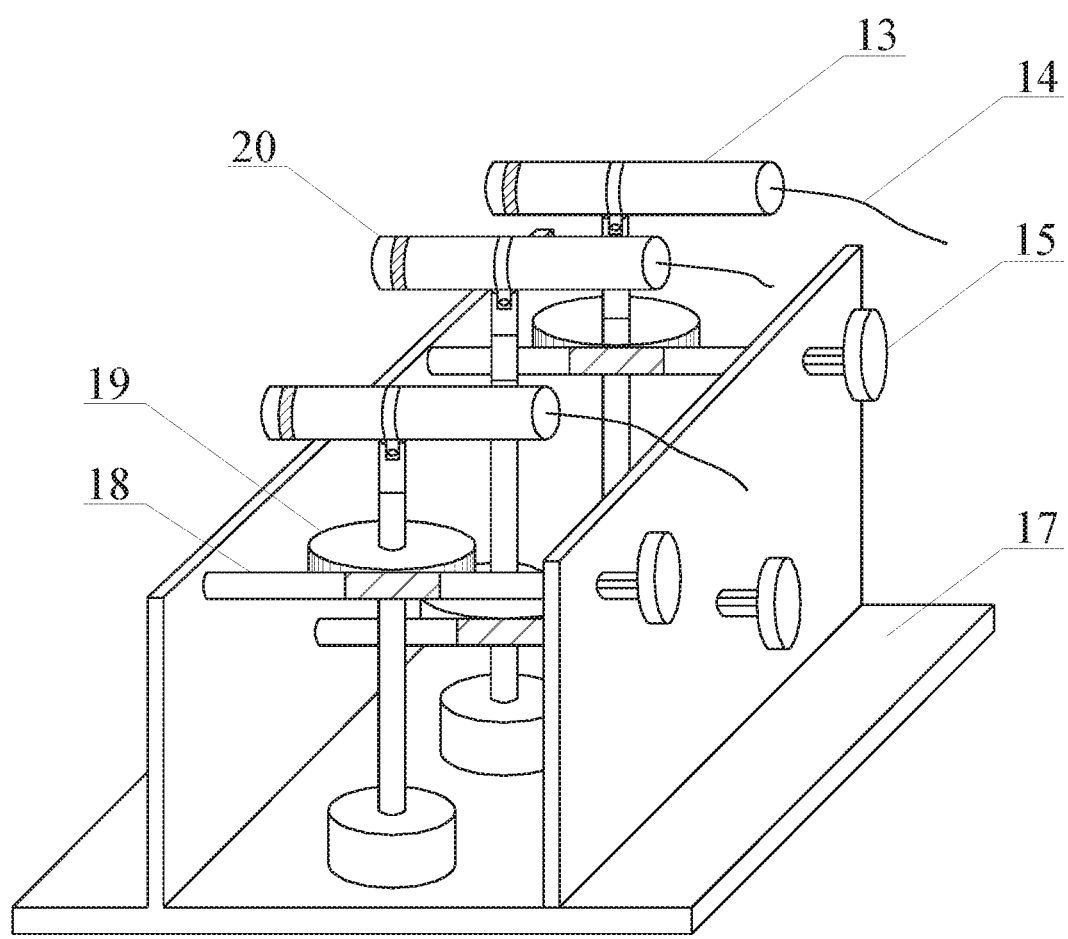
FIG. 3 is the schematic diagram of the mechanically micro-adjustable device for a linear laser source.
Figure 4:
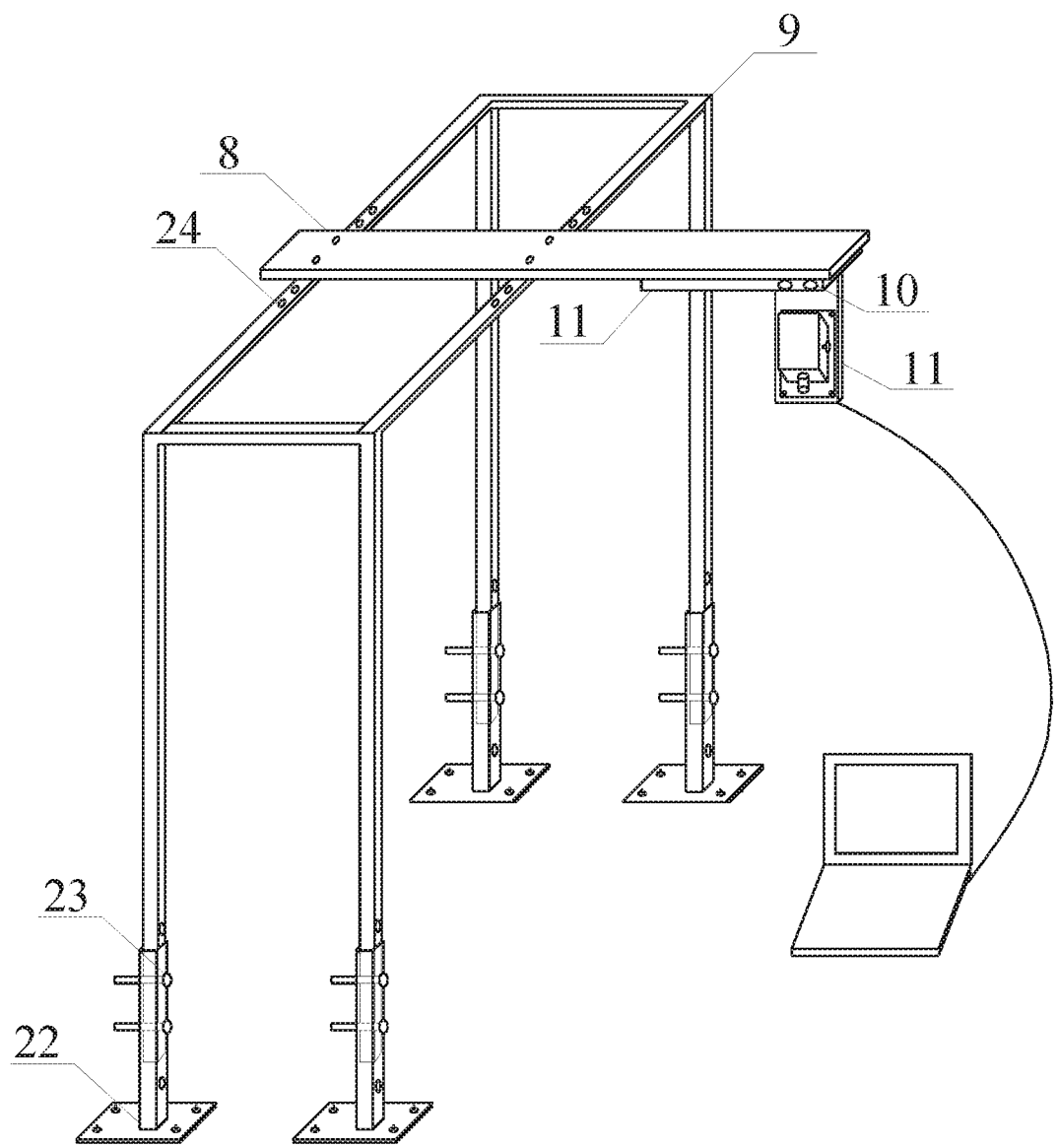
FIG. 4 is the schematic diagram of an image acquisition device.
Figure 5:
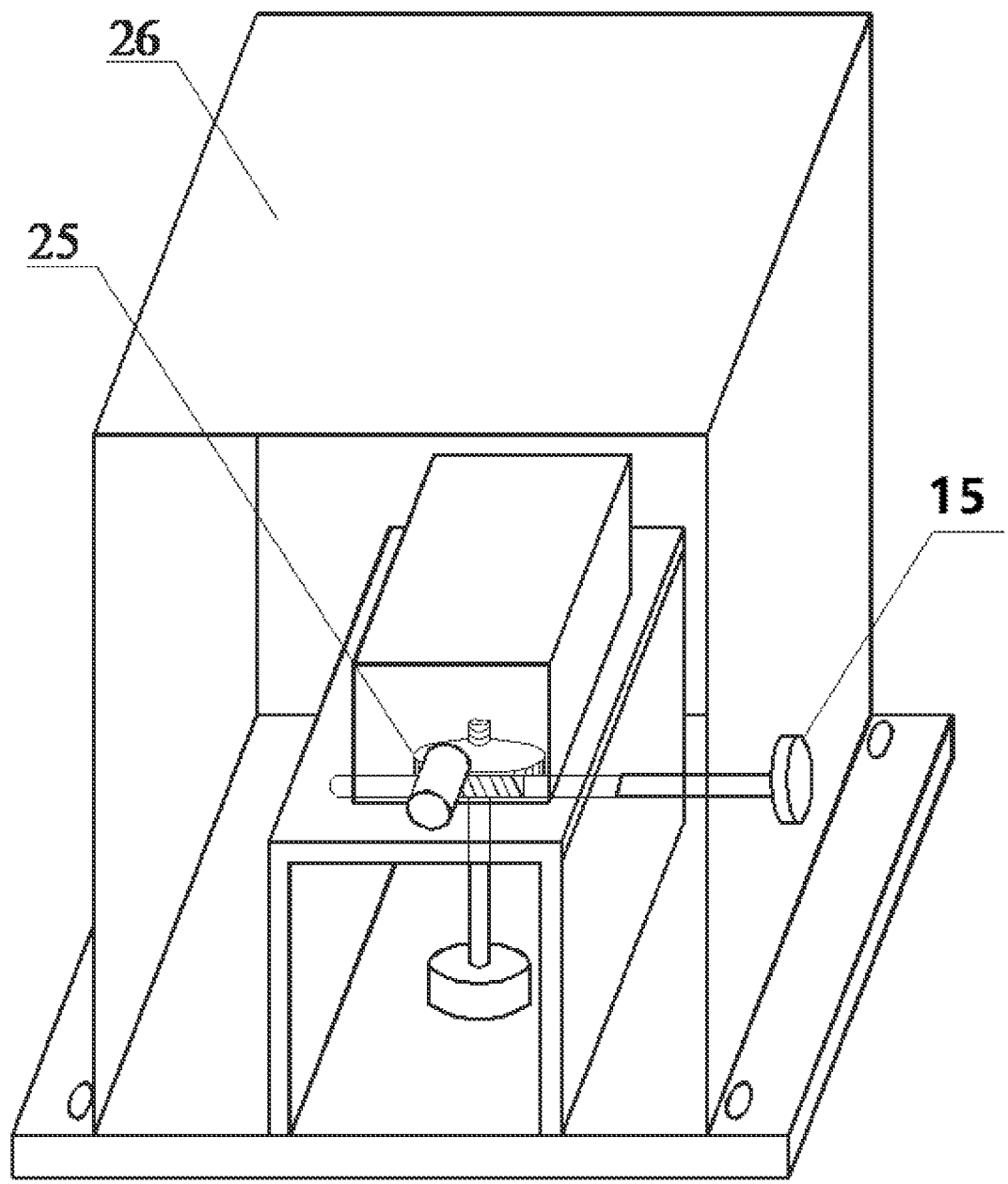
FIG. 5 is the schematic diagram of a micro-adjustable device for the image acquisition device.

Components shown in the figures: 1(*a*) first host, 1(*b*) second host, 2 power box, 3 metal pedestal, 4 slope landform, 5 parallel and equidistant laser stripes, 6 computer, 7 equidistant connecting-hole, 8 support bar, 9 bracket, 10 pulley, 11 camera, 12 detachable rain cover, 13 linear laser source, 14 power supply line, 15 handle knob, 16 screw, 17 main bottom plate, 18 worm, 19 rotatable turbine, 20 adjusting knob, 21 clamping groove, 22 pedestal, 23 bolt, 24 fixing hole, 25 turbine, and 26 video box.

DETAILED DESCRIPTION

The present invention will be further illustrated in combination with the case studies and description figures.

As a case study for the gravity erosion experiment in the Liudaogou Catchment, Shenmu County, the specific implementation steps of the topography-observation device based on the mechanically micro-adjustable dual hosts are described as follows:

Step 1: Finely Regulating the Topography Meter

A support rod with a rotatable turbine 19 is fixed on the main bottom plate 17. A linear laser source 13 is fixed on the top end of the support rod with the turbine through a bolt. A worm 18 is hinged with the rotatable turbine 19 through the thread. The handle knob 15 fixed on the side plate can be rotated so that the linear laser source 13 rotates around the support rod. As a result, the laser lines projected by the linear laser source 13 onto a slope to be tested are equidistant. The adjustment accuracy is up to 1 mm. An adjusting knob 20 at the front end of the linear laser source 13 can be rotated to make the laser lines turn around at an angle of 360°, and the rotation adjustment accuracy is 1°. With the mechanically micro-adjustable device, a laser source can be regulated both for parallel and equidistant adjustments, which can be independently conducted without any interference each other. After the linear laser source 13 has been precisely adjusted, the laser lines emitted by the linear laser source 13 will become parallel and equidistant, and then a detachable rain cover 12 will be installed on the main bottom plate 17 with a screw 16. The linear laser source 13 on the dual hosts has the advantages of high reliability, strong stability, long service life, and powerful anti-interference performance. For example, a linear laser source giving out red laser has a diameter of only 16 mm and an expected service life of 10000-12000 hours.

Step 2: Arranging the Site for the Dual Hosts Measuring the Gravity Erosion

The dual hosts are independently installed on two metal pedestals 3 symmetrically around the center line, and the hosts project a group of horizontal laser stripes 5, which are parallel and equidistant (at the distance of 30 mm), to the experimental model. The laser stripes are recorded by a camera 11 perpendicular to the laser-planes. The dual hosts are eudipleural on the horizontal planes of the same elevation so that the intersecting parts of the equidistant laser-planes emitted by the dual hosts are overlapped. The power is provided to the linear laser source 13 from power box 2 via a power supply line 14. A camera 11 with a laser sight is fixed on an observation bracket 9 of the image acquisition device, and the visual line of the laser sight is parallel to that of the camera 11. The method can dynamically observe the processes of the mass failures on the slope landform 4 in a rainfall simulation experiment in real time. The range of the slope landform 4 observed with the measurement system is 3-5 m in width and 1.5-2 m in height.

Step 3: Installing the Image Acquisition Device

The observation bracket 9 is fixed on the stub with a pedestal 22. The support bar 8, which is provided with a video box 26 and camera 11, is installed on the upper center of the observation bracket 9. A pulley 10 with a clamping groove 21 is installed on the lower surface of the support bar 8, the pulley 10 is connected with the video box 26, and the video box 26 can move back and forth along the clamping groove 21 of the support bar 8. Several equidistant fixing holes 24 for the cross-bar on the observation bracket 9. When the fixing bolt of the support bar 8 is adjusted, the video box 26 will move left and right in the horizontal direction. The video box 26 can move up and down in the vertical direction if the height of the observation bracket 9 is revised as the bolt 23 of the stub is loosened. Turn the handle knob 15 in the video box 26, the camera 11 will rotate around the turbine 25. The rotation accuracy can be up to 1°. As a result, a perfect angle between the camera sight and plumb surface can be obtained.

Step 4: Dynamically Observing Gravity Erosion in Real Time

The dual hosts 1a-b of the topography meter project a group of parallel horizontal laser stripes 5 with the equidistant distance of 30 mm to the experimental slope landform 4. The laser stripes are recorded by the camera 11 perpendicular to the laser-planes. Consequently, each laser line on the slope surface is a landform contour, and the image of slope landform 4 with laser stripes captured by the camera 11 is a contour landform map. The dual hosts of the topography meter can observe and record the dynamic change of the gravity erosion on a steep slope in the rainfall simulation experiment in real time. The video of the dynamic change can be recorded and stored in the image acquisition system of the computer 6.

Step 5: Processing the Video Data

Each event of gravity erosion can be recognized according to the rainfall process video recorded by the camera 11. Based on the video, the screenshots at the moments before and after every gravity erosion event will be obtained, and the failure scars will be framed. Then the R2V software is used to vectorize the contours in the screenshots and assign actual elevations to the contours. Afterwards, the contours are transferred into the ArcGIS software to form a three-dimensional tin file, so as to obtain the volume of the slope body. The difference of the slope volume at the moments before and after the gravity erosion is the amount of the gravity erosion. The sum of the amounts of the all gravity erosions is the total amount of gravity erosion in the rainfall simulation experiment. The equation to calculate the amount of gravity erosion is shown as follows:

$$g_{ij} = v_{1(i,j)} - v_{2(i,j)}$$

$$G_j = \sum_{i=1}^{N} g_{(i,j)}$$

where i represents the sequence number of the failure incident during a rainfall; j represents the sequence number of the rainfall for a certain initial landform; $g_{i,j}$ is the volume of an individual failure mass; $G_j$ is the total amount of the gravity erosions in a rainfall event; and N represents the total number of mass failures in an event of rainfall.

The invention claimed is:

1. A topography-observation device based on mechanically micro-adjustable dual hosts, wherein the topography-observation device comprises dual hosts, an image acquisition device and an accessory;

the dual hosts emit parallel and equidistant laser planes (5) from different directions, project the laser planes (5) onto a slope landform (4), and simultaneously dynamically observe the evolution behavior of the slope landform; the laser planes emitted by the dual hosts are overlapped; cooperating with the image acquisition device, the dual hosts can obtain a contour map of the slope landform and then form a three-dimensional slope model, so as to realize the dynamic observation for the slumping process of the slope landform under a rainfall;

the dual hosts are mainly composed of linear laser sources (13), micro-adjustable devices, power supply lines (14), main bottom plates (17), detachable rain covers

(12) and screws (16); the dual hosts are connected with a power box (2), and they are fixed on metal pedestals (3); the linear laser sources (13) and the micro-adjustable devices are arranged inside the detachable rain covers (12);

the detachable rain covers (12) are fixed on the main bottom plates (17) using the screws (16);

the mechanically micro-adjustable devices comprise support rods, adjusting knobs (20), worms (18), handle knobs (15) and turbines (19); a plurality of mechanically micro-adjustable devices are fixed on the main bottom plates (17); each linear laser sources (13) corresponds to a fixed mechanically micro-adjustable device;

the linear laser sources (13) project a group of parallel and equidistant horizontal laser stripes onto the slope landform (4); the mechanically micro-adjustable devices are equidistant and parallel, and they are fixed on the cases of the dual hosts with the main bottom plates (17); the spacing of the support rods is same to the distance of the laser-planes;

the linear laser sources (13) are fixed on the upper ends of the support rods; the lower ends of the support rods are fixed on the main bottom plates (17); the laser-planes will become horizontal as the adjust knobs (20) on the linear laser sources (13) are tuned; the turbines (19) are fixed and they penetrate through the support rods; the worms (18) with the handle knobs (15) are hinged with the turbines (19) through the threads; when the handle knobs (15) are rotated, the linear laser sources (13) will be slightly turned around the support rods because of the transmission of the rotatable turbines (19) and the worms (18), so that the axes of all the linear laser sources (13) are accurately perpendicular to the main bottom plates (17); after regulated with the adjusting knob (20) and knobs handling worms (15), the dual hosts will emit a group of laser-planes, and then a group of equidistant and parallel laser lines will be formed on the slope landform (4);

two cover plates are vertically fixed on the main bottom plates (17) and independently positioned on both sides of the mechanically micro-adjustable devices to provide a safety space for the mechanically micro-adjustable devices;

the image acquisition device comprises a camera (11), a computer (6), an observation bracket (9), and a video box (26) fixing the camera;

the observation bracket (9) is a height-adjustable four-leg bracket which is fixed on a stub with a bolt; several pairs of fixing holes (24) are drilled on the two cross rods to support the cross rod (8); the legs of the observation brackets (9) are two-section embedded structures, which are provided with equidistant connecting-holes (7) and held together with bolts (23); the legs are fixed on the pedestal (22); the support bar (8) is perpendicular to the observation bracket (9), and one end of the rod is suspended outside of the observation bracket (9); a pulley (10) with a clamping groove (21) is installed on the lower surface of the support bar (8);

the pulley (10) is connected with the video box (26); the video box (26) can move back and forth along the clamping groove (21) of the support bar (8); the camera (11) is installed in the video box (26); at an angle perpendicular to the laser-planes, the camera (11) shoots the slope landform (4) with the parallel laser stripes; the data collected by the camera (11) will be transmitted to the computer (6) via a data cable which connects the camera (11) and the computer (6);

the accessory comprises the power box and the power supply lines; a transformer bank and a battery are arranged in the power box; an external power supply of 220V is converted to the weak current of 6-8 V in order to supply power for the linear laser sources (13); nevertheless, a battery will be used to supply power for the linear laser sources (13) if no external power supply is provided.

\* \* \* \* \*